(12) United States Patent
Espinosa-Sanchez et al.

(10) Patent No.: US 10,981,748 B2
(45) Date of Patent: Apr. 20, 2021

(54) FRICTIONLESS SERVICE CARRIAGE SYSTEM

(71) Applicant: Airbus Defence and Space SAU, Madrid (ES)

(72) Inventors: Martin Espinosa-Sanchez, Madrid (ES); Javier Valdeolmos Traba, Madrid (ES)

(73) Assignee: AIRBUS DEFENCE AND SPACE S.A.U., Madrid (ES)

( * ) Notice: Subject to any disclaimer, the term of this patent is extended or adjusted under 35 U.S.C. 154(b) by 247 days.

(21) Appl. No.: 16/190,522

(22) Filed: Nov. 14, 2018

(65) Prior Publication Data

US 2019/0144234 A1 May 16, 2019

(30) Foreign Application Priority Data

Nov. 15, 2017 (EP) .................................... 17382776

(51) Int. Cl.
*B65H 57/04* (2006.01)
*B64D 39/02* (2006.01)
(Continued)

(52) U.S. Cl.
CPC ............. *B65H 57/04* (2013.01); *B64D 39/02* (2013.01); *B64D 39/06* (2013.01);
(Continued)

(58) Field of Classification Search
CPC ................ B65H 57/04; B65H 54/2812; B65H 75/4407; B65H 57/14; B65H 2701/33;
(Continued)

(56) References Cited

U.S. PATENT DOCUMENTS

| 1,646,804 A | * | 10/1927 | Westwood | ............... B66D 1/36 |
| | | | | 242/397.3 |
| 2,301,208 A | * | 11/1942 | Gear | ......................... 242/390.8 |

(Continued)

FOREIGN PATENT DOCUMENTS

| EP | 0 054 961 | 6/1982 |
| EP | 0 311 784 | 4/1989 |

(Continued)

OTHER PUBLICATIONS

Extended Search Report for EP17382776.7 dated Apr. 5, 2018, 8 pages.

*Primary Examiner* — William A. Rivera
(74) *Attorney, Agent, or Firm* — Nixon & Vanderhye P.C.

(57) ABSTRACT

A frictionless service carriage system including: a shaft 1 having a first 2 and a second 3 helix-shaped guide in its surface, each helix shaped-guide 2, 3 defining a linear movement along the longitudinal axis of the shaft 1 of a carriage 4 in opposite directions and both helix shaped-guides 2, 3 crossing each other 2, 3 along the longitudinal axis of the shaft 1, wherein the carriage 4 includes a movable element 5 located successively in each of the helix-shaped guides 2, 3 and movable along the guides 2, 3, the movable element 5 comprising a set of rolling elements 6 along the first or second helix-shaped guide 2, 3 of the shaft 1 and configured such that in a crossing with the other helix-shaped guide 2, 3, the set of rolling elements 6 has at least two contact points with the helix-shaped guide 2, 3 for which it rolls.

19 Claims, 4 Drawing Sheets

(51) Int. Cl.
  *B65H 57/14* (2006.01)
  *B65H 54/28* (2006.01)
  *F16C 29/04* (2006.01)
  *F16C 29/00* (2006.01)
  *B65H 75/44* (2006.01)
  *B64D 39/06* (2006.01)

(52) U.S. Cl.
  CPC ......... *B65H 54/2812* (2013.01); *B65H 57/14* (2013.01); *B65H 75/4407* (2013.01); *F16C 29/005* (2013.01); *F16C 29/04* (2013.01); *B65H 2701/33* (2013.01)

(58) Field of Classification Search
  CPC ......... B64D 39/06; B64D 39/02; F16C 29/04; F16C 29/005
  See application file for complete search history.

(56) References Cited

U.S. PATENT DOCUMENTS

| | | | | |
|---|---|---|---|---|
| 2,421,269 A | * | 5/1947 | Joyce | 242/397.3 |
| 2,494,003 A | * | 1/1950 | Russ | B65H 75/4407 242/397.3 |
| 2,634,926 A | * | 4/1953 | Worlidge | B64D 39/00 244/135 A |
| 3,048,054 A | * | 8/1962 | Heim | F16H 25/122 74/567 |
| 3,664,596 A | * | 5/1972 | Lenk | B65H 54/2812 242/483.5 |
| 3,672,587 A | * | 6/1972 | Pierce | B65H 54/2812 242/483.5 |
| 3,674,049 A | | 7/1972 | MacGregor | |
| 3,799,464 A | * | 3/1974 | Bosch | B65H 54/2809 242/483.7 |
| 3,836,087 A | * | 9/1974 | Tschentscher | B65H 54/2812 242/477.3 |
| 3,854,343 A | * | 12/1974 | May | F16H 25/122 74/57 |
| 3,980,252 A | * | 9/1976 | Tae | B65H 54/2812 242/397.3 |
| 5,131,438 A | | 7/1992 | Loucks | |
| 5,573,206 A | | 11/1996 | War | |
| 6,375,123 B1 | | 4/2002 | Greenhalgh et al. | |
| 7,422,179 B2 | | 9/2008 | Mouskis | |
| 7,681,827 B2 | * | 3/2010 | Chiu | B65H 75/4402 242/397.2 |
| 2003/0038214 A1 | | 2/2003 | Bartov | |
| 2015/0284107 A1 | | 10/2015 | Lopez et al. | |

FOREIGN PATENT DOCUMENTS

| | | |
|---|---|---|
| JP | 4409495 | 2/2010 |
| WO | 2008/013150 | 1/2008 |

* cited by examiner

FRICTIONLESS SERVICE CARRIAGE SYSTEM

RELATED APPLICATION

This application claims priority to European Patent Application No. 17382776.7, filed Nov. 15, 2017, the entirety of which is incorporated by reference.

FIELD

The invention is related to a service carriage system for lateral hose guidance configured to reduce friction among its constituent elements. The invention is applicable to air to air refueling AAR operations that employs a hose and drogue system.

BACKGROUND

Hose and drogue refueling systems include a drum for winding/unwinding the hose in connection with an air-to-air refueling operation. As the hose is wound onto the drum, typically the hose forms several layers on the drum. Typically, the hose moves across the face of the drum from side to side of the drum as the hose is wound onto the drum. As the hose reaches one side of the drum, it reverses direction and again moves across the face of the drum. Each pass across the face of the drum causes the hose to form a new layer of hose on the drum.

Due to the internal construction of the hose, which provides high rigidity, the hose requires a strong force to wind the hose onto the drum. An auxiliary service carriage system is required to guide the hose laterally back and forth across the face of a drum for a proper winding and unwinding of the hose onto or from in the drum. The auxiliary service carriage system includes a service carriage for guiding the hose onto or off the drum.

The auxiliary service carriage system is typically geared to the drum. The service carriage moves the hose back and forth across the face of the drum as the hose is wound onto or off the drum. The movements of the service carriage system and the drum are synchronized by a series of gears.

The service carriage system is geared to the drum by an Archimedean shaft, e.g., Archimedes' screw, which is part of the auxiliary system. The Archimedian shaft is which offset from the drum and parallel to the rotating axis of the drum. The Archimedean shaft includes two helical guides, e.g., grooves, in the surface of the shaft. Each guide forms a helix along the longitudinal axis of the shaft. As the shaft rotates, each helical guide drives the service carriage along a linear direction parallel to the rotational axis of the shaft and the rotational axis of the drum. One helical guide drives the service carriage across the face of the drum in one direction and the other helical guide drives the service carriage in the opposite direction.

The helical guides have several cross points on the shaft. At the cross points the cross sectional shape of each guide expands due to the crossing of the two guides and corners are formed in each of the guides due to the intersection of the guides.

A conventional service carriage has a pin which fits into the helical guides. As the shaft turns, the pin is driven by one of the helical guides to move the service carriage and the hose carried by the service carriage across the face of the drum. The pin moves along one helical guide until reaching an end region of the shaft. At the end region, the pin slides into the other helical guide and reverses its direction of movement across the face of the drum.

The pin may have a shape similar to a shark fin. The pin moves laterally back and forth across the drum while being in one of the helical guides. The two helical guides in the shaft have cross points where both guides intersect. The pin is to say in the same guide as it travels along the guide and through the cross points. However, the pin may move out of the narrow path defined by a guide at a cross point and bump into one of the corners formed by the intersecting guides.

The conventional carriage system has a disadvantage in that as the pin wears as it moves back and forth along the helical guides. The wear on the pin requires the pin to be periodically replaced or repaired.

As the pin wears, the possibility increases that risk that the pin does not smoothly traverse the cross points and become stuck at one of the cross points or switch guides at a cross points. When the carriage becomes stuck or the carriage reverses course before fully traversing the drum, the hose no longer is wound onto the drum uniformly across the face of the drum. Rather, more hose is wound on some portions of the drum than other portions, or the hose binds with the drum. Non-uniform winding of the drum is not desired and can lead to situations where the hose cannot be fully wound onto the drum from landing of the aircraft.

SUMMARY

The present invention is directed to solve the pin wear problem. To reduce wear, a mechanical design based on rolling between the different parts of the carriage system is proposed.

The invention may be embodied as a service carriage system that includes:

a shaft comprising a first and a second helix-shaped guide in its surface, each helix shaped-guide is configured to define a linear movement along the longitudinal axis of the shaft of a carriage in opposite directions and both helix shaped-guides crossing each other along the longitudinal axis of the shaft, and a movable element configured to be located in the first and second helix-shaped guides and movable along the guides.

The movable element includes a set of rolling elements configured to roll one behind the other along the first or second helix-shaped guide of the shaft and configured such that in a crossing with the other helix-shaped guide, the set of rolling elements has at least two contact points with the helix-shaped guide for which it rolls.

The set of rolling elements prevents the carriage from changing from one helix into the other at the rolling elements cross between both helixes. The set of rolling elements rotates freely in the axial direction of the shaft, in the same way as the replaced pin does.

The set of rolling elements rolls over the same helix and is also configured such that in every crossing of the two helix-shaped guides, the set has at least two contact points with the helix-shaped guide in which the set is rolling thus avoiding the set of rolling elements from going into the other helix.

The invention may be embodied as a service carriage assembly configured to be mounted adjacent a drum in a hose refueling system in a tanker aircraft, the service carriage system includes: a shaft configured to turn with the drum, be offset from the drum and have a rotational axis parallel to a rotational axis of the drum; helical guide grooves in the shaft wherein each of the helical guide grooves forms a helix which is coaxial to the rotational axis of the shaft and the helical guide grooves are angularly offset from each other on the shaft; a service carriage configured to move back and forth along the shaft and driven by rotation of the shaft, wherein the service carriage includes an arcuate shaped support, and rolling elements mounted to the arcuate shaped support wherein the rolling elements are aligned along an arcuate line.

The arcuate line may conform to a curvature of each of the helical guide grooves.

The service carriage may include a shaft extending from the arcuate shaped support in a direction opposite to the rolling elements, wherein the shaft is configured to turn to rotate the rolling elements about an axis of the shaft.

The helical guide grooves may intersect at an end region of the shaft and the intersection of the guide grooves forms a groove which is wider than each of the guide grooves.

SUMMARY OF FIGURES

To complete the description and in order to provide for a better understanding of the invention, a set of drawings is provided. The set of drawings form an integral part of the description and illustrate preferred embodiments of the invention. The set of drawings are.

DETAILED DESCRIPTION

Figure 1:
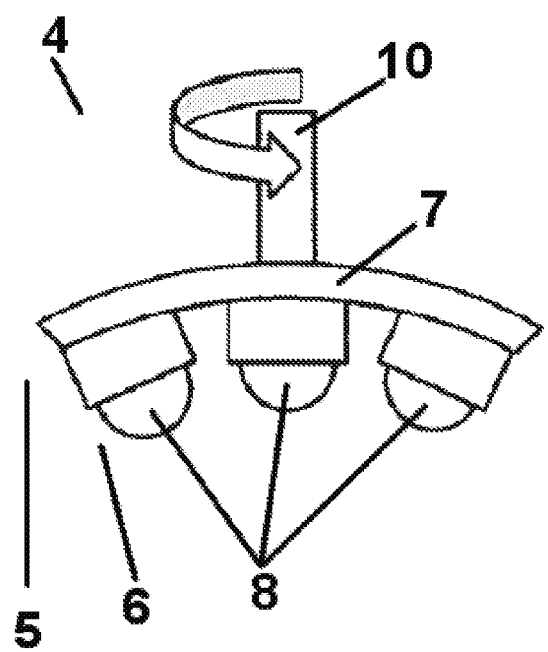
FIG. 1 shows a schematic front view of a first embodiment of the movable elements having a set of rolling elements, specifically three balls.
Figure 2:
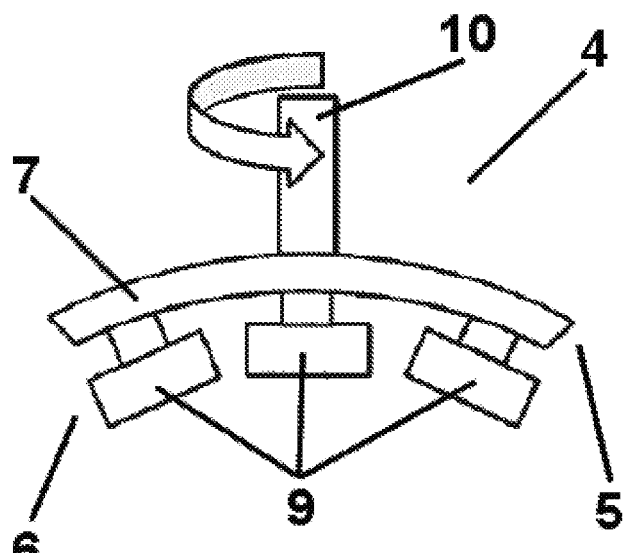
FIG. 2 shows a schematic front view of a second embodiment of the movable element having a set of rolling elements, specifically three bearings having a cylindrical shape.

FIGS. 1 to 5 show two embodiments for the set of rolling elements 6, one based on the use of balls 8 and another based on the use of bearings 9 having a cylindrical shape and configured to roll around its longitudinal axis.

The balls 8 offer low friction rolling through the guide 2, 3. The bearings 9 are easier to manufacture than the balls 8 but may have higher friction as the bearings move through the guide.

The carriage includes a support 7 for supporting the set of rolling elements 6. The carriage positions the rolling elements 6 such that all rolling elements 6 are simultaneously and continuously in contact with the helix-shaped guide 2, 3 when rolling.

The support 7 may have an arquated shape, e.g., arcuate. In this regard, the support may have a concave bow shape which conforms to the curvature of the shaft 1 along the directions of the surfaces of the guides 2, 3. The support holds mounts for the rolling elements 6 such that the rolling elements are all positioned in the guides 2, 3 while the support is positioned next to the shaft.

The set of rolling elements 6 may include three rolling elements, such as three balls 8 or three bearings 9. The set of rolling elements and support 7 are configured to roll along the guides 2, 3. The rolling elements may be aligned along a line having a curvature conforming to a curvature of each of the guides 2, 3. The rolling elements may each include a housing fixed to the support and a roller, such as a spherical or cylindrical bearing, supported by the housing. The roller rolls while in the housing. The rollers roll as they move along the guides 2, 3. The rolling of the rollers minimize friction between the rolling elements and the guides 2, 3.

Figure 3:
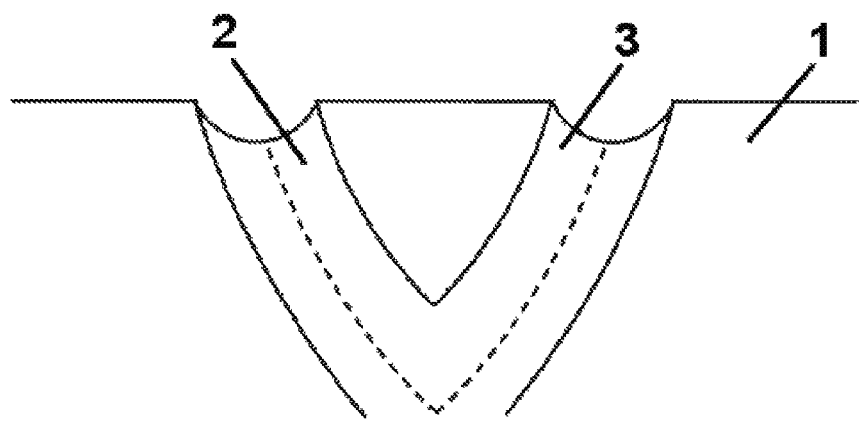
FIG. 3 shows a guide having a spherical cross section adapted for the rolling of set of rolling elements shown in FIG. 1.
Figure 4:
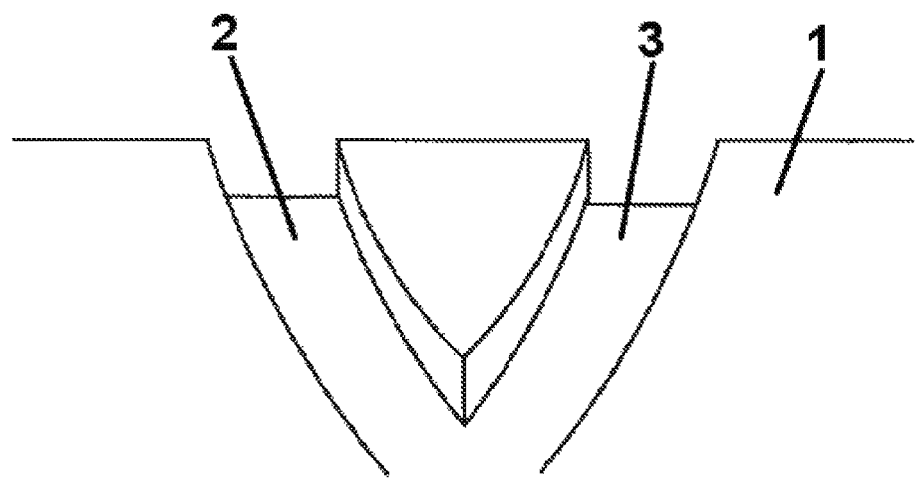
FIG. 4 shows a guide having a rectangular cross section adapted for the rolling of set of rolling elements shown in FIG. 2.

The design of a cross-section of the helix-shaped guide 2, 3 in an outer surface of the shaft 1 may be selected to conform to the type of rolling elements 6. As shown in FIG. 3, a guide 2, 3 formed by grooves in the shaft 1 that are semi-circular in cross-section conforms to the outer circular surface of the balls 8 of the rolling elements 6. As shown in FIG. 4, a guide 2, 3 formed by grooves in the shaft 1 that are rectangular in cross section conform to bearings 9 that form the rolling elements 6.

The carriage may also include a rod 10 located perpendicular to and attached to the support 7. The rod 10 and the support 7 rotate about a longitudinal axis of the rod 10. The rod 10 allows the support 7 to turn and hence allows the turning of the set of rolling elements 6 when they reach ends of the helix 2, 3 at the end of the shaft 1. The rolling elements 6 are turned so that they may be positioned to enter the other helix 2, 3.

Figure 5:
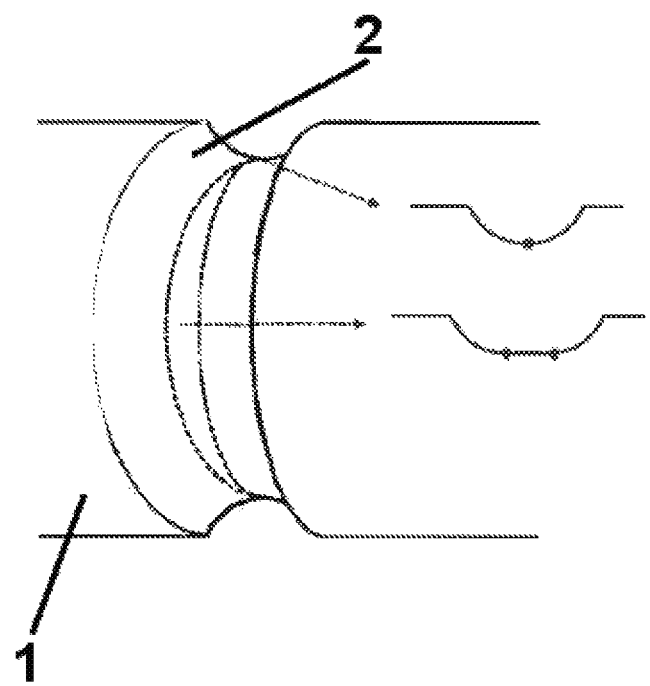
FIG. 5 shows the transition between both helixes at the end of the shaft.

On both sides of the shaft 1, in the transition between both helixes 2, 3, the guide 2, 3 is modified to allow the movement of the set of rolling elements 6. This is achieved by progressively widening the cross-section of the grooves forming the guide 2, 3 at the meeting point of both helixes 2, 3 as can be seen in FIG. 5.

Figure 6:
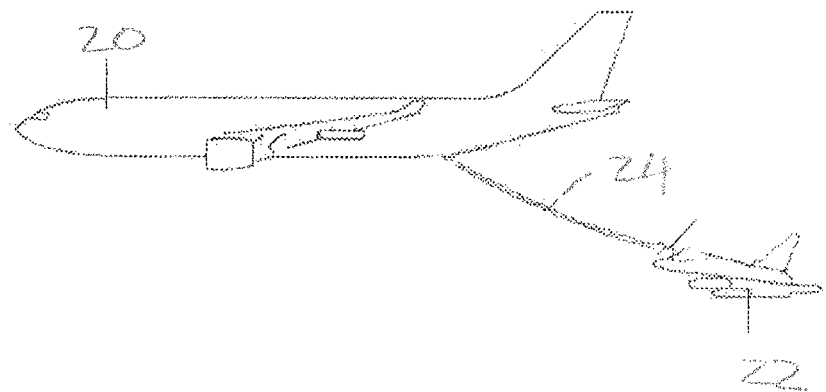
FIG. 6 shows a tanker aircraft refueling another aircraft in an air-to-air refueling operation.

FIG. 6 shows a tanker aircraft 20 refueling a fuel receiving aircraft 22 in an air-to-air refueling operation. A refueling hose 24 is extended from the tanker aircraft 22 towards the other aircraft 22. The hose is extended by unwinding the hose from a drum within the tanker aircraft.

Figure 7:
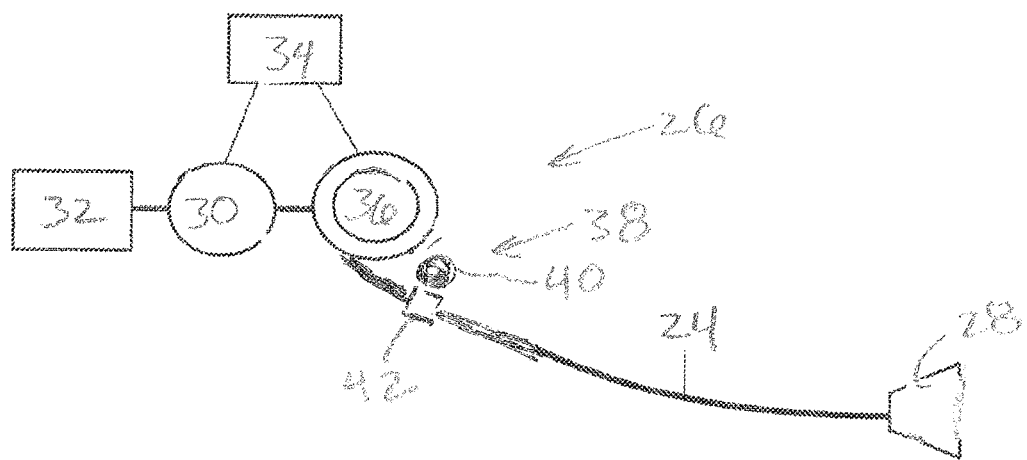
FIG. 7 schematically shows a hose and drogue refueling system for a tanker aircraft.

FIG. 7 schematically shows a hose and drogue refueling system 26 for a tanker aircraft 20. The system 26 may include a hose 24 with a drogue 28 at a distal end of the hose. The drogue 28 connects to a fuel receiver in the other aircraft 22 to allow fuel to flow from the hose into the other aircraft. The proximal end of the hose 24 is connected to a fuel pump 30 which pumps fuel from a fuel tank 32 within the tanker aircraft. A controller 34 controls the pump, fuel delivery through the hose and the winding and unwinding of the hose 24 on a drum 36

A service carriage assembly 38 is offset and near the drum 36. The service carriage assembly includes the carriage 4 shown in FIGS. 1 and 2. The service carriage assembly 38 includes a shaft 40 and is supported by refueling system such that the service carriage assembly can carry the forces (load) of the hose as the hose is wound and unwound for air-to-air refueling operations. The shaft 40 is offset from the drum and parallel to the drum. The shaft 40 is the same as the shaft 1 shown in FIGS. 3 to 5 and includes the helical guides 2, 3 shown in those figures.

The service carriage assembly may include a hose guide 42 that includes an opening to receive the hose 24. The hose guide 42 is supported by the service carriage 38. The hose guide positions the hose with respect to the drum as the hose is wound onto the drum or unwound from the drum. The hose guide 42 moves back and forth across the width of the drum (in a direction perpendicular to the plane of FIG. 7). The hose guide may be attached to the rod 10 of the service carriage 38. The hose guide 42 is supported by and moved by the support 7 (FIGS. 1 and 2) as the support moves along the guides 2, 3 as the shaft 1 rotates with the rotation of the drum 36.

While at least one exemplary embodiment of the present inventions is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A service carriage system comprising:
   a shaft including a first and a second helix-shaped guide in a surface of the shaft, each helix shaped-guide configured to define a linear movement along a longitudinal axis of the shaft in opposite directions and both the first and second helix shaped-guides crossing each other along the longitudinal axis of the shaft, and
   a carriage including a movable element configured to be located in and move along the first and second helix-shaped guides,
   wherein in that the movable element includes:
       at least three rolling elements configured to roll one behind the other along in successively each of the first and second helix-shaped guides, and configured such that in a crossing with the other helix-shaped guide, the at least three rolling elements have at least two contact points with the first or second helix-shaped guides, and
       a support configured to support the at least three rolling elements, wherein the support has an arcuate shape configured to position the rolling elements in at least one of the helix-shaped guides, and the support holds each of the at least three rolling elements in a fixed alignment in which each of the rolling elements is aligned along an arcuate line.

2. The service carriage system according to claim 1, wherein the at least three rolling elements comprises three rolling elements.

3. The service carriage system according to claim 2, wherein the at least three rolling elements are held in the fixed alignment by the support both while the at least three rolling elements are in the first helix-shaped guide and while in the second helix-shaped guide.

4. The service carriage system according to claim 3, wherein a cross-section of the helix-shaped guides is semi-circular.

5. The service carriage system according to claim 2, wherein the three rolling elements are bearings each having a cylindrical shape.

6. The service carriage system according to claim 5, wherein a cross-section of each of the first and second helix-shaped guides is rectangular.

7. The service carriage system according to claim 1, wherein the carriage comprises a rod attached to and perpendicular to the support, wherein the rod and the support are configured such the support is rotatable around a longitudinal axis of the rod.

8. The service carriage system according to claim 1, wherein the first and the second helix-shaped guides intersect at an end of the shaft and the intersection forms a progressively widening of the first and the second helix-shaped guides.

9. The service carriage of claim 1, wherein the support further comprises a rod extending outward from a surface of the support opposite to a side facing the rolling elements, and the support pivots about the rod.

10. A service carriage assembly configured to be mounted adjacent a drum in a hose refueling system in a tanker aircraft, the service carriage system includes:
    a shaft configured to turn with the drum, be offset from the drum and have a rotational axis parallel to a rotational axis of the drum;
    helical guide grooves in the shaft wherein each of the helical guide grooves forms a helix coaxial to the rotational axis of the shaft and the helical guide grooves are angularly offset from each other on the shaft;
    a service carriage configured to move back and forth along the shaft and driven by rotation of the shaft, wherein the service carriage includes:
        an arcuate shaped support including at least three mounts arranged in a fixed alignment in which each of the mounts are aligned along an arcuate line, and
        at least three rolling elements each respectively mounted to one of the at least three mounts of the arcuate shaped support, wherein the at least three rolling elements are in a fixed alignment along the arcuate line.

11. The service carriage assembly of claim 10 wherein the arcuate line conforms to a curvature of each of the helical guide grooves.

12. The service carriage assembly of claim 10 wherein the service carriage includes a shaft extending from the arcuate shaped support in a direction opposite to the rolling elements, wherein the shaft is configured to turn to rotate the rolling elements about an axis of the shaft.

13. The service carriage assembly of claim 10 wherein a hose guide is fixed to the service carriage.

14. The service carriage assembly of claim 10, wherein the at least three rolling elements are spherical bearings.

15. The service carriage assembly of claim 14, wherein the helical guide grooves are semi-circular in cross section.

16. The service carriage assembly of claim 10, wherein the at least three rolling elements are cylindrical bearings.

17. The service carriage assembly of claim 16, wherein the helical guide grooves each include a bottom which is straight in a cross section of each of the grooves.

18. The service carriage assembly of claim 10, wherein the helical guide grooves intersect at an end region of the shaft and the intersection of the guide grooves forms a groove which is wider than each of the guide grooves.

19. The service carriage of claim 10, wherein the support further comprises a rod extending outward from a surface of the support opposite to a side facing the rolling elements, and the support pivots about the rod.

* * * * *